Feb. 27, 1934.                F. W. GA·                    1,948,964
              COOLING SYSTEM FOR ELF TRICAL CABLES
                        Filed May 11, 1928         2 Sheets-Sheet 1

INVENTOR.
FRAZER W. GAY
BY
George D. Richards
ATTORNEY.

Feb. 27, 1934.   F. W. GAY   1,948,964
COOLING SYSTEM FOR ELECTRICAL CABLES
Filed May 11, 1928   2 Sheets-Sheet 2

INVENTOR.
FRAZER W. GAY.
BY George D. Richards
ATTORNEY.

Patented Feb. 27, 1934

1,948,964

UNITED STATES PATENT OFFICE 1,948,964

COOLING SYSTEM FOR ELECTRICAL CABLES

Frazer W. Gay, Newark, N. J., assignor to General Cable Corporation, New York, N. Y., a corporation of New Jersey Application May 11, 1928. Serial No. 276,851

9 Claims. (Cl. 173—266)

The present invention relates to cooling systems and particularly to cooling systems for underground electrical high voltage cables.

Owing to the development of the electric industry the amount of electric energy transmitted is constantly increasing, requiring increasing voltages to be carried by underground cables. This has caused a corresponding increase in the thickness of cable insulation. As the voltage carried by cables advances into the hundreds of kilovolts, the thickness of insulation becomes so great that the common method of cooling the cables by cooling the outside of the cable sheath becomes impracticable, since the heat produced in the cable cannot pass through the thick cable insulation with sufficient rapidity to maintain a reasonably cool conductor.

The invention has for its principal feature to provide a novel cooling system that is capable of adequately cooling electrical cables regardless of the thickness of their insulation.

A second feature lies in the provision of a cooling system of the above character which, when applied to a high voltage cable, will enable the current carried by the cable to be increased many times.

A third feature is to provide a cooling system of the above character that will permit expansion and contraction of the cable to take place without flexure of the cable.

A fourth feature of the invention lies in the provision of a cable joint for a cooling system of the above character that is of simple construction and reliable in operation and which may be completely fabricated at a factory, thereby requiring but a simple assembly job to be performed in the field.

Other features and advantages will become apparent from the specification, taken in connection with the accompanying drawings wherein the invention is embodied in concrete form.

In the drawings:—

Figure 1:
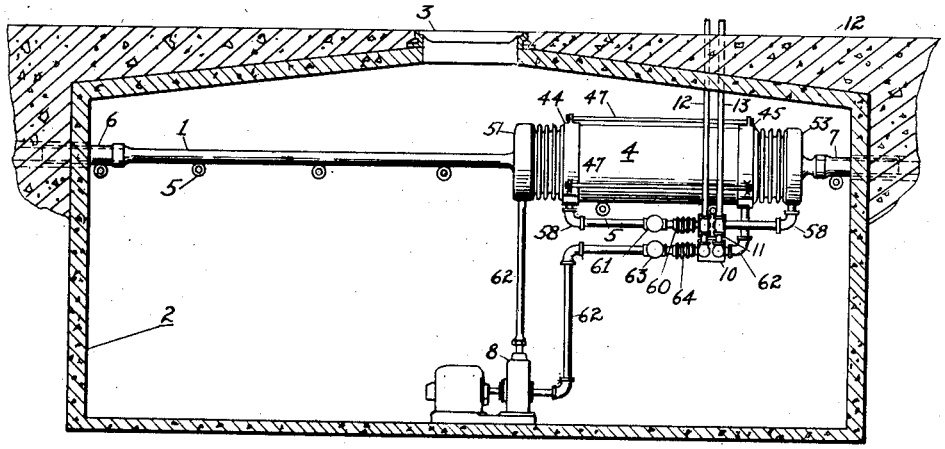
Figure 1 is a schematic representation of the cooling system of this invention applied to a high voltage cable.

As illustrated in Figure 1 of the drawings, a lead covered cable 1 having a hollow core conductor 43 extends through the manhole 2 having the manhole cover 3. Cable 1 is spliced together in the manhole 2 by the splice joint 4. Cable 1 and splice joint 4 are supported at intervals within the manhole 2 by rollers 5, that are mounted upon shafts secured to the side wall of the manhole. Cable 1 is strengthened where it enters and leaves the manhole 2 by short lengths of pipe 6 and 7. These short lengths of pipe 6 and 7 fit the cable 1 snugly and are secured to it as by wiped joints at the inner ends of these pipes. These pipes 6 and 7 prevent the lead sheathing of the cable 1 from rubbing against the end walls of the manhole 2, thereby eliminating a common source of fracture of the cable.

A motor driven pump 8 is illustrated comprising a portion of the pumping system utilized for circulating cooling fluid through the cable 1 and splice joint 4. Coolers 10 and 11 are arranged to cool the circulating fluid in its passage through the cable 1 and splice joint 4. Coolers 10 and 11 are connected to upwardly extending pipes 12 and 13 which are in turn connected to a suitable radiator (not shown) positioned above the ground level 12. A radiator of the type illustrated in my applications Ser. No. 271,478, filed April 20, 1928 or Ser. No. 273,637 filed April 28, 1928 may be used for this purpose, or any other suitable radiating means.

Figure 2:
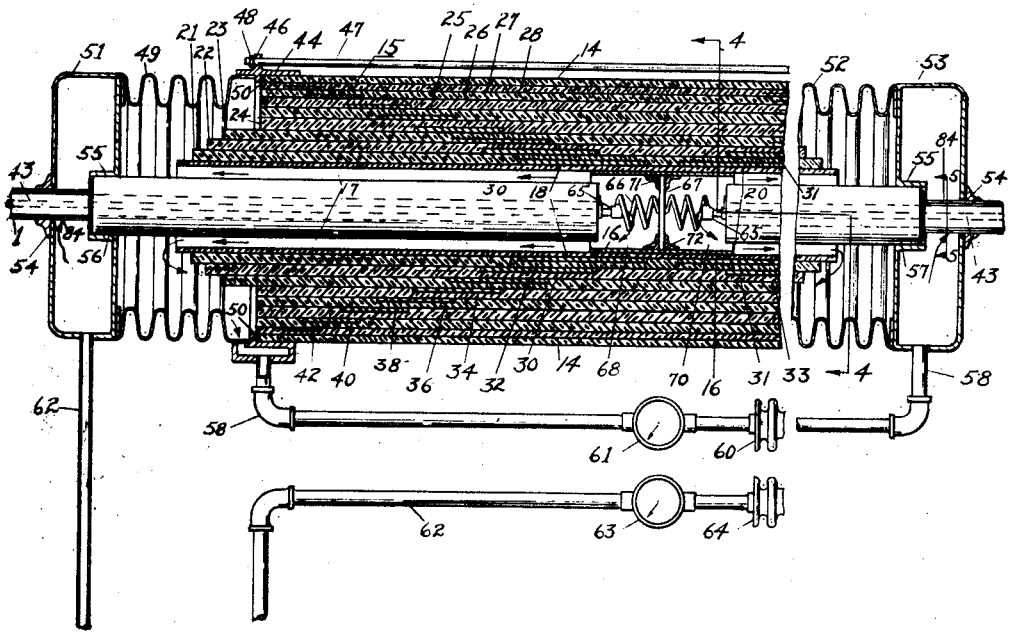
Figure 2 is a vertical, part sectional view of a portion of the structure of Figure 1 with parts broken away.

As is also illustrated in Figure 2, the splice joint 4 comprises a hollow cylindrical casing 14 of insulating material. An insulating bushing, designated as a whole by the reference numeral 15, is contained within the casing 14. Insulating bushing 15 is built up upon a metallic hollow cylinder 16 having open ends. In assembling the insulating bushing 15, a sheet of insulation is wound upon the cylinder 16 to form a containing tube 17. A pair of slightly spaced metal foil cylinders 18 and 20 are wound upon the tube 17 of insulation. Successive alternate layers of insulation and metal foil cylinders are then wound upon the cylinders 18 and 20. The successive layers of insulation are designated 21 to 28 inclusive. Metal foil cylinders 30 to 34 and 18, 20, 36, 38, 40 and 42 are shown in Fig. 2 of the drawings owing to the breaking away of a portion of Fig. 2, the remainder of these metal foil cylinders are not shown in this figure. The several metal foil cylinders have approximately the same surface area and form with each other and the conductor 43 of the cable 1 a series of condensers in which the strains upon the layers of insulation are proportional to the differences of potential between the successive metal cylinders. The strain upon the insulating bushing 15 is, therefore, distributed throughout its thickness and is not concentrated upon its inner surface. The members of each pair of successive metal foil cylinders are spaced longitudinally a greater and greater distance apart, as illustrated in Figure 2.

Two end plates 44 and 45 are mounted on the ends of the casing 14. The end plates 44 and 45 have lugs 46 that are provided with aligned apertures. A plurality of draw rods 47, of insulating material such as fibre, extend through the aligned apertures in the end plates 44 and 45. Nuts 48 are threaded upon the draw rods 47 and secure the end plates 44 and 45 to the casing 14. A gasket 50 is interposed between each end plate 44 and 45 and the ends of the casing 14 in order to prevent the escape of circulating cooling fluid from the splice joint 4.

A collapsible metal tube 49 has its inner ends secured as by welding to the end plate 44 and its outer end similarly secured to a header 51. A similar collapsible metal tube 52 has its inner end secured to the end plate 45 and its outer end secured to a header 53. The headers 51 and 53 are of the same construction. The outer end walls of the headers 51 and 53 are provided with central circular apertures through which the cable 1 extends. The openings between the cable 1 and the outer end walls of the headers 51 and 53 are sealed by wiped joints 54. The inner end walls of the headers 51 and 53 are apertured and are provided with inwardly extending annular flanges 55 that are adapted to snugly enclose the outer ends of similar insulating bushings 56 and 57.

Piping 58 connects the header 53 to the end plate 44. This piping 58 extends through the cooler 11 and is provided with an expansion joint 60 of the collapsible tube type. A fluid flow meter 61 is shown as inserted in the piping 58 between the header 53 and end plate 44. Piping 62 connects the header 51 to the end plate 45. Pump 8 and a fluid flow meter 63 is inserted in the piping 62 between the header 51 and plate 45. Piping 62 extends through the cooler 10 and is provided with an expansion joint 64.

The cable 1 is cut away for a portion of its length within the splice joint 4, thereby exposing opposing ends of the hollow conductor 43. Clamps 65 (see also Fig. 3) having central apertures are rigidly mounted upon the ends of the conductor 43. A flexible conductor 66 is wound in the form of a spring and has its ends secured to the clamps 65. Conductor 66 electrically connects the ends of the conductor 43 and at the same time permits these ends to move toward and away from each other during the expansion and contraction of the cable 1 under temperature changes. The conductor 66 extends snugly through an aperture in a metallic piston 67 that is free to move within the cylinder 16. Piston 67 is normally positioned midway between the ends of the cylinder 16 and divides this cylinder into two chambers 68 and 70. Flexible metallic conducting fingers 71 are secured to the periphery of the piston 67 and contact with the inner walls of the cylinder 16, thereby electrically connecting the piston 67 to the cylinder 16. Leather washers 72 are carried by the piston 67 and engage the inner walls of the cylinder 16 for the purpose of preventing the circulating fluid from flowing past piston 67 from chambers 68 to chamber 70, or vice versa.

Figure 3:
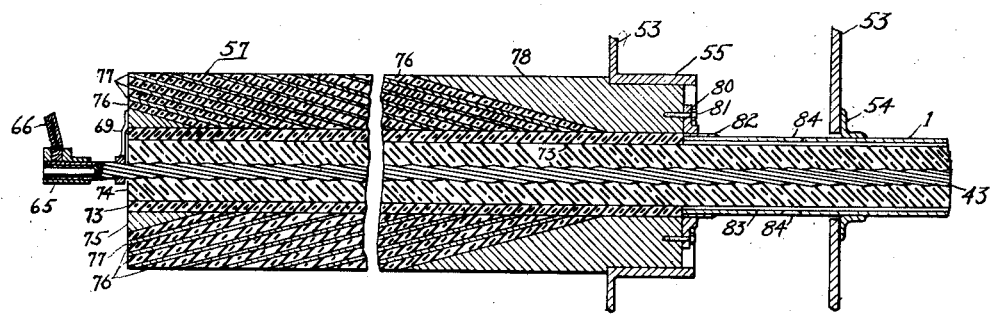
Figure 3 is an enlarged vertical sectional view of a part of the structure shown in Figure 2.
Figure 4:
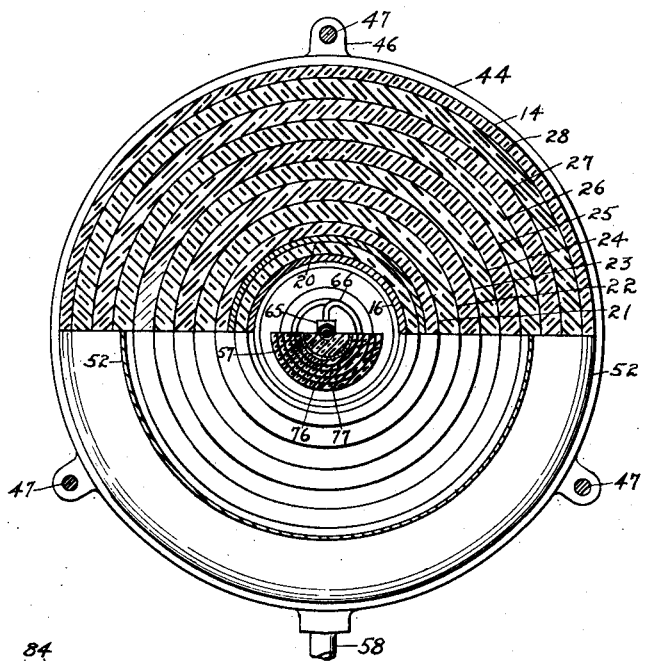
Figure 4 is an enlarged section taken along the line 4—4 of Figure 2.
Figure 5:
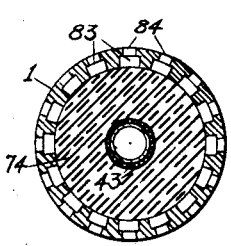
Figure 5 is an enlarged section taken along the line 5—5 of Figure 2.

The lead sheathing is slit and removed from the length of cable 1 that extends between the headers 51 and 53 and under flanges 55, and the insulating bushings 56 and 57 are mounted upon this portion of the cable. As illustrated in Figure 3, these insulating bushings comprise an inner sleeve 73 of insulating material that is arranged to slide easily over the insulation 74 of cable 1. A hollow metallic core 75 is secured upon the inner end of the sleeve 73 and is bonded by a connector 69 to the conductor 43. A hollow conical shaped layer of insulation 76 adjoins the outer surface of the metallic core 75. A hollow conical shaped metallic condenser plate 77 adjoins the outer surface of the layer of insulation 76. Successive layers of insulation 76 and metallic condenser plates 77 serve to build up the body of the insulating bushing. A metal end plate 78 is secured upon the outer end of the sleeve 73 and has a portion of its interior conforming to the exterior of a layer of insulation 76 which adjoins this end plate. End plate 78 is enclosed for a portion of its length by the annular flange 55 formed on the inner end wall of the header 53. A clamp 80 having screws 81 and suitable tape 82 serve to bond the end plate 78 to the lead sheath of cable 1. The several metallic condenser plates 77 have the same surface area and form with each other and the conductor 43 of the cable 1 a series of condensers in which the strains upon the layers of insulation 76 are proportional to the differences of potential between the successive condenser plates 77. The dimensions of the condenser plates and the thickness and specific inductive capacity of the layers of insulation are chosen so that the voltage gradient from the conductor 43 to the end plate 78 is substantially uniform. The sheath of cable 1 is provided with a plurality of longitudinally extending interior grooves 83 (see Figure 5) through which the circulating medium is adapted to pass in cooling the cable 1. A plurality of apertures 84 extend radially through the sheath of cable 1 and connect the grooves 83 with the interiors of the headers 51 and 53.

In assembling the splice joint 4 upon the cable 1 within the manhole 2 of Figure 1, a short section of the cable is cut out so as to provide a suitable space between the opposing ends of the conductor 43 to allow for expansion and contraction under temperature changes. The cable sheath is removed from the opposing end portions of the cable for a sufficient distance to accommodate the insulating bushings 56 and 57. Apertures 84 are cut in the cable sheathing near the ends of this sheathing. If desired, other means may be used for connecting the longitudinal grooves 83 of the cable sheathing to the interior of the headers 51 and 53. Thus, an exterior annular groove may be cut in the cable sheath, in the position of the apertures 84, of sufficient depth to expose the grooves 83. The right end portion of the splice joint 4, comprising the header 53, the collapsible metal tube 52 and end plate 45, is disconnected as a unit from the rest of the splice joint by removing the nuts 48 bearing against the end plate 45 and sliding this end plate off of the casing 14. This right end portion of the splice joint is then passed onto the right hand end portion of cable 1 and the remainder of the splice joint 4 is passed onto the left hand end portion of cable 1. The insulating bushings 56 and 57 are assembled upon the exposed cable insulators 74 of the opposing end portions of the cable 1, and the flexible conductor 66 is connected to the ends of the cable conductor 43 through the intermediary of the clamps 65. The right end portion of the splice joint 4 is moved to the left over the insulating bushing 57 so that the flange 55 of header 53 engages and surrounds the right end of this insulating bushing. Likewise the remainder of the splice joint 4 is moved to the right over the insulating bushing 56 so that the flange 55 of header 51 engages and surrounds the left end of this insulating bushing. During this movement; the flexible conductor 66 and piston 67 will move into the cylinder 16, the conductor 66 acting to position piston 67 centrally of this cylinder. The splice joint may now be finally assembled by inserting the rods 47 through the apertures on the lugs 46 of end plate 45 and applying nuts 48 to the ends of these rods after which the end plate 45 may be drawn up against the casing 14, thereby sealing the splice joint.

In operation, the circulating cooling fluid is caused to pass within the hollow core of conductor 43 along one section of the cable to a splice joint 4, where it is caused to pass into the grooves 83 directly under the sheath of the next section of cable. The cooling fluid passes along this latter section of cable within the grooves 83. Thus, in alternate lengths of cable the circulating cooling fluid passes within the conductor core and within the grooves or ducts 83. At the end of the cable line, the circulating fluid is caused to return through those passages not used on its outward trip.

Referring to the installation illustrated in Figure 1, the section of cable 1 that is to the left of splice joint 4 may be assumed to have circulating cooling fluid passing to the right within its conductor 43. Upon reaching the splice joint 4 this cooling fluid passes out of the conductor 43 and into the chamber 68 within cylinder 16. From the chamber 68, the cooling fluid passes to the left around the outside of the insulating bushing 56 and within the tube 17 as indicated by the arrows in Figure 2. From the tube 17, this cooling fluid passes into the collapsible metal tube 49 and from thence through the end plate 44 into the piping 58. Within the piping 58, the cooling fluid passes through the meter 61 which indicates the rate of flow, through the insulated expansion joint 60, and through the cooler 11 to the header 53. From the header 53, the cooling fluid passes through the apertures 84 into the grooves 83 in the cable sheath. The cooling fluid passes along these grooves 83 in the section of cable 1 that is to the right of the splice joint until it reaches the next splice joint where it is caused to enter the conductor of the next succeeding cable section. The cooling fluid hence passes from the interior of the cable to the cable sheath in alternating cable sections until it reaches the end of the line where it is returned through the passages not used in the outward journey. The circulating fluid, while passing within the interior of the cable in one cable section, will be raised in temperature, thereby absorbing heat, until it attains substantially the temperature of the conductor 43. Upon passing to the cable sheath of the next cable section, this circulating fluid will be cooled, not only by the action of the coolers 10 and 11 but also by the cable sheath which is at a lower temperature than the core of the cable. The coolers 10 and 11 may even be omitted in certain installations, in which event the cooling effect of the cable will be depended upon to retain the circulating fluid at a moderate temperature.

In the installation illustrated in Figure 1, the circulating cooling fluid will return through the conductor 43 of the section of cable 1 that is to the right of the splice joint 4. Upon reaching the splice joint 4, this fluid passes out of the conductor 43 and into the chamber 70 within cylinder 16. From the chamber 70, the cooling fluid passes to the right around the outside of the insulating bushing 57 and within the tube 17 as indicated by the arrows in Figure 2. From the tube 17, this cooling fluid passes into the collapsible metal tube 52 and from thence through the end plate 45 into the piping 62. Within the piping 62, the cooling fluid passes through the cooler 10, meter 63, and pump 8 to the header 51. From the header 51, the cooling fluid passes through the apertures 84 into the grooves 83 in the cable sheath. The cooling fluid passes along these grooves 83 in the section of cable 1 that is to the left of the splice joint until it reaches the next splice joint where it is caused to enter the conductor of the next succeeding cable section as before.

The pumps 8 are positioned in manholes along the line of cable wherever desired and may be connected to either piping 62 or 58. Figure 1 shows a pump 8 connected to piping 62. It will be apparent to those skilled in the art, that in manholes where the pump 8 is not desired the piping 62 will extend directly from meter 63 to the header 51. These pumps circulate the cooling fluid or medium at such a speed that its temperature will not change more than a few degrees in its passage through the cable. Pumps 8 maintain a low comparatively uniform pressure in the cable so that at points where the cooling fluid leaves the cable the pressure will be only slightly above atmosphere, while at points where the cooling fluid enters the cable the pressure will be higher by as much as that pressure which is needed to circulate the fluid. The pumps may be used, if desired, to circulate the cooling fluid directly through radiators positioned above the ground instead of using the coolers 10 and 11 which in turn are connected to radiators. Also, the cooling fluid may be taken directly from the conductor 43, formed through the splice joint 4, through an external radiator, and then returned through the splice joint to the conductor 43 of the next section of cable, thereby omitting the circulation of cooling fluid through the cable sheath if desired.

It will be noted that the splice joint 4 can be completely fabricated and tested in a factory remote from the point of installation and can be shipped and stored completely sealed to prevent entrance of moisture. The splice joint can be applied quickly in the field by relatively unskilled men, since the job is largely one of assembly.

It will be noted that the insulating bushing 15 provides a uniform electrical pressure gradient in a radial direction and that the insulating bushings 56 and 57 provide a substantially uniform electrical pressure gradient longitudinally and in the direction of flow along the circulating fluid passages between the high pressure conductor and the substantially grounded cable sheath.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A cable and cooling system therefor comprising, a hollow core and a sheath for each cable section, said sheaths having longitudinal ducts, means for causing a cooling medium to flow along the hollow core of one section of the cable to be cooled, and means for conducting said cooling medium to a duct in the sheath of the next succeeding section of said cable, said first named means acting to cause the cooling medium to flow along said duct in the latter section of cable.

2. In combination a cable and cooling system therefor, a hollow core and sheath for each cable section, said sheaths having longitudinal ducts, a splice joint, said splice joint having passages through which a circulating fluid flows in its passage from the hollow core of one cable section to ducts in the sheath of the next cable section, whereby, the circulating fluid which is heated in the core of the first cable section is cooled in the ducts of the sheath of the second cable section.

3. In combination a cable and cooling system therefor, said cooling system comprising a splice joint, said splice joint having a casing, means within said casing for permitting expansion and contraction of the cable connected by said splice joint, and insulating means within said casing, said insulating means being so constructed and arranged that the voltage gradient from the cable conductor to the outside of said casing is substantially uniform.

4. In combination, a cable and a cooling system therefor, said cooling system having a splice joint connecting adjacent sections of said cable, said splice joint comprising, a casing, means within said casing for permitting expansion and contraction of the cable sections connected by said splice joint, insulating means within said casing, said insulating means having passages for containing a cooling fluid and arranged to distribute the electrical pressure uniformly along said passages.

5. In combination, a cable and a cooling system therefor, said cooling system having a splice joint, said splice joint comprising a flexible conductor connecting the ends of the conductors of the cable to be cooled, insulating bushings surrounding the end portions of the cable conductors, said insulating bushings providing a passage extending in the direction of the cable for accommodating a cooling fluid and a casing surrounding said insulating bushings.

6. In combination, an electrical cable and a cooling system therefor, said cooling system having a splice joint, said splice joint comprising a flexible conductor connecting the ends of the conductor of the cable to be cooled, insulating bushings surrounding the end portions of the cable conductor, said insulating bushings providing a passage extending in the direction of the cable, a casing surrounding said insulating bushings and collapsible members connected to the ends of said casing for permitting expansion and contraction of the cable, said collapsible members providing chambers communicating with the passage provided by the insulating bushings for accommodating a cooling fluid.

7. In combination, electrical cable sections having hollow cores and cooling ducts in their sheathing for receiving a circulating cooling fluid, and a cooling system having a splice joint comprising, an insulating bushing surrounding the opposed ends of the conductor of the cable to be cooled, a cylinder positioned within said insulating bushing, a piston movable within said cylinder and dividng the interior of said cylinder into two chambers, a collapsible tube connected to one end of said insulating bushing and a similar collapsible tube connected to the other end of said bushing, said tubes being arranged to deflect under the expansion and contraction of the cable, a header secured to one of said collapsible tubes, and similar header secured to the other collapsible tube, and piping connecting the header at each end of the splice joint to the collapsible tube at the other end of said joint, the circulating cooling fluid being arranged to pass out of one end of the cable conductor, through a chamber within said cylinder, through one of the collapsible tubes, through said piping to a header on the other end of said joint, and, from said header into the cooling ducts in the sheathing of the other end of the cable.

8. An electrical cable and a cooling system therefor, said cable having a duct extending longitudinally along said cable within its sheath and adapted to carry a cooling medium, a splice joint intermediate adjacent cable sections, an external cooling means, said splice joint having passages through which the cooling medium passes out of said duct of one cable section to said external cooling means and from said external cooling means back to said duct of the adjacent cable section.

9. In combination, an insulated electrical cable and a cooling system therefor, said cable having a passage coextensive with the cable, an exterior sheath around said insulated cable, said sheath having a duct coextensive therewith, and means to circulate a cooling medium through said cable passage and thence through said duct of said exterior sheath.

FRAZER W. GAY.